(12) United States Patent
Alibabaei et al.

(10) Patent No.: US 10,119,197 B2
(45) Date of Patent: Nov. 6, 2018

(54) SOLAR WATER SPLITTING IN A MOLECULAR PHOTOELECTROCHEMICAL CELL

(71) Applicants: The University of North Carolina at Chapel Hill, Chapel Hill, NC (US); North Carolina State University, Raleigh, NC (US)

(72) Inventors: Leila Alibabaei, Carrboro, NC (US); Matthew Kyle Brennaman, Durham, NC (US); Michael Norris, Seattle, WA (US); Gregory N. Parsons, Raleigh, NC (US); Thomas J. Meyer, Chapel Hill, NC (US)

(73) Assignees: The University of North Carolina at Chapel Hill, Chapel Hill, NC (US); North Carolina State University, Raleigh, NC (US)

( * ) Notice: Subject to any disclaimer, the term of this patent is extended or adjusted under 35 U.S.C. 154(b) by 369 days.

(21) Appl. No.: 14/479,995

(22) Filed: Sep. 8, 2014

(65) Prior Publication Data
US 2015/0072852 A1    Mar. 12, 2015

Related U.S. Application Data

(60) Provisional application No. 61/875,015, filed on Sep. 7, 2013.

(51) Int. Cl.
*C25B 1/00*    (2006.01)
*C25B 11/04*    (2006.01)

(52) U.S. Cl.
CPC .......... *C25B 11/0452* (2013.01); *C25B 1/003* (2013.01); *Y02E 60/368* (2013.01); *Y02P 20/135* (2015.11)

(58) Field of Classification Search
CPC ...................................... C25B 1/003
See application file for complete search history.

(56) References Cited

PUBLICATIONS

Concepcion et al., "Catalytic and Surface-Electrocatalytic Water Oxidation by Redox Mediator—Catalyst Assemblies," Angewandte Chemie 48(50), pp. 9473-9476, Dec. 2009.*
Grinis et al., "Collector-Shell Mesoporous Electrodes for Dye Sensitized Solar Cells," Israel Journal of Chemistry 48(3-4), pp. 269-275, Dec. 2008.*

(Continued)

*Primary Examiner* — Melvin C. Mayes
(74) *Attorney, Agent, or Firm* — Thrive IP®; Jeremy M. Stipkala

(57) ABSTRACT

A Dye Sensitized Photoelectrosynthesis Cell (DSPEC) splits water with visible light using a derivatized, core/shell nanostructured photoanode with the core having a high surface area conductive metal oxide film—such as nanoITO (indium tin oxide) or nanoATO (antimony tin oxide)—coated with a thin outer shell of, for example, $TiO_2$ formed by Atomic Layer Deposition (ALD). A "chromophore-catalyst assembly" 1, $[(PO_3H_2)_2bpy)_2Ru(4\text{-Mebpy-4-bimpy})Ru(tpy)(OH_2)]^{4+}$, which combines both light absorber and water oxidation catalyst in a single molecule, is attached to the $TiO_2$ shell. Visible photolysis of the resulting core/shell/assembly structure with a Pt cathode results in water splitting into hydrogen and oxygen.

13 Claims, 12 Drawing Sheets

(56) References Cited

PUBLICATIONS

Norris et al., "Redox Mediator Effect on Water Oxidation in a Ruthenium-Based Chromophore—Catalyst Assembly," Journal of the American Chemical Society 135(6), pp. 2080-2083, Jan. 2013.*

Panda et al., "Nanoscale size effect of titania (anatase) nanotubes with uniform wall thickness as high performance anode for lithium-ion secondary battery," Journal of Power Sources 204, pp. 162-167, Apr. 2012.*

King et al., "TiO2 Inverse Opals Fabricated Using Low-Temperature Atomic Layer Deposition," Advanced Materials 17(8), pp. 1010-1013, Apr. 2005.*

N. Nelson, C. F. Yocum, "Structure and function of photosystems I and II." Annu. Rev. Plant Biol. 57, 521-565 (2006).

D. J. Vinyard, G. M. Ananyev, G. C. Dismukes, "Photosystem II: the reaction center of oxygenic photosynthesis." Annu. Rev. Biochem. 82, 577-606 (2013).

J. J. Concepcion, R. L. House, J. M. Papanikolas, T. J. Meyer, "Chemical approaches to artificial photosynthesis." Proc. Nat. Acad. Sci., U.S.A. 109, 15560-15564 (2012).

D. Gust, T. A. Moore, A. L. Moore, "Solar fuels via artificial photosynthesis." Acc. Chem. Res. 42, 1890-1898 (2009).

M. G. Walter et al., "Solar water splitting cells." Chem. Rev. 110, 6446-6473 (2010).

S. Bensaid, G. Centi, E. Garrone, S. Perathoner, G. Saracco, "Towards artificial leaves for solar hydrogen and fuels from carbon dioxide." ChemSusChem 5, 500-521 (2012).

A. J. Cowan, J. R. Durrant, "Long-lived charge separated states in nanostructured semiconductor photoelectrodes for the production of solar fuels." Chem. Soc. Rev. 42, 2281-2293 (2013).

G. P. Smestad, A. Steinfeld, "Review: photochemical and thermochemical production of solar fuels from H2O and CO2 using metal oxide catalysts." Ind. Eng. Chem. Res. 51, 11828-11840 (2012).

Z. Zou, J. Ye, K. Sayama, H. Arakawa, "Direct splitting of water under visible light irradiation with an oxide semiconductor photocatalyst." Nature 414, 625-627 (2001).

L. Alibabaei et al., "Applications of metal oxide materials in dye sensitized photoelectrosynthesis cells for making solar fuels: let the molecules do the work." J. Mater. Chem. A 1, 4133-4145 (2013).

M. R. Norris, J. J. Concepcion, Z. Fang, J. L. Templeton, T. J. Meyer, "Low overpotential water oxidation by a surface-bound Ruthenium-chromophore-Ruthenium-catalyst assembly." Angew. Chem. Int. Ed., 52, 13580-13583 (2013).

Z. Chen, J. J. Concepcion, J. W. Jurss, T. J. Meyer, "Single-site, catalytic water oxidation on oxide surfaces." J. Am. Chem. Soc. 131, 15580-15581 (2009).

J. J. Concepcion, M.-K. Tsai, J. T. Muckerman, T. J. Meyer, "Mechanism of water oxidation by single-site Ruthenium complex catalysts." J. Am. Chem. Soc. 132, 1545-1557 (2010).

D. L. Ashford et al., "Photoinduced electron transfer in a chromophore-catalyst assembly anchored to TiO2." J. Am. Chem. Soc. 134, 19189-19198 (2012).

A. Hagfeldt, G. Boschloo, L. Sun, L. Kloo, H. Pettersson, "Dye-sensitized solar cells." Chem. Rev. 110, 6595-6663 (2010).

M. Gratzel, "The artificial leaf, bio-mimetic photocatalysis." CATTECH 3, 4-17 (1999).

B. C. O'Regan, J. R. Durrant, "Kinetic and energetic paradigms for dye-sensitized solar cells: moving from the ideal to the real." Acc. Chem. Res. 42, 1799-1808 (2009).

R. Mohammadpour, Z. A. Iraji, A. Hagfeldt, G. Boschloo, "Comparison of trap-state distribution and carrier transport in nanotubular and nanoparticulate TiO2 electrodes for dye-sensitized solar cells." ChemPhysChem 11, 2140-2145 (2010).

P. G. Hoertz, Z. Chen, C. A. Kent, T. J. Meyer, "Application of high surface area tin-doped indium oxide nanoparticle films as transparent conducting electrodes." Inorg. Chem. 49, 8179-8181 (2010).

W. Song et al., "Interfacial electron transfer dynamics for [Ru(bpy)2((4,4'-PO3H2)2bpy)]2+ sensitized TiO2 in a dye-sensitized photoelectrosynthesis cell: factors influencing efficiency and dynamics." J. Phys. Chem. C 115, 7081-7091 (2011).

A. Fujishima, K. Honda, "Electrochemical photolysis of water at a semiconductor electrode." Nature 238, 37-38 (1972).

T. Nakagawa, N. S. Bjorge, R. W. Murray, "Electrogenerated IrOx nanoparticles as dissolved redox catalysts for water oxidation." J. Am. Chem. Soc. 131, 1557 8-15579 (2009).

T. Nakagawa, C. A. Beasley, R. W. Murray, "Efficient electro-oxidation of water near its reversible potential by a mesoporous IrOx nanoparticle film." J. Phys. Chem. C 113, 12958-12961 (2009).

J. J. Concepcion, R. A. Binstead, L. Alibabaei, T. J. Meyer., "Application of the rotating ring disc electrode technique to water oxidation by surface-bound molecular catalysts." Inorg. Chem. 52, 10744-10746 (2013).

J. H. Alstrum-Acevedo, M. K. Brennaman, T. J. Meyer, "Chemical approaches to artificial photosynthesis." 2. Inorg. Chem. 44, 6802-6827 (2005).

J. D. Blakemore et al., "Half-sandwich iridium complexes for homogeneous water-oxidation catalysis." J. Am. Chem. Soc. 132, 16017-16029 (2010).

R. Brimblecombe, A. Koo, G. C. Dismukes, G. F. Swiegers, L. Spiccia, "Solar driven water oxidation by a manganese molecular catalyst inspired by photosystem II." J. Am. Chem. Soc. 132, 2892-2894 (2010).

L. Duan et al., "A molecular ruthenium catalyst with water-oxidation activity comparable to that of photosystem II." Nat. Chem. 4, 418-423 (2012).

L. Duan, A. Fischer, Y. H. Xu, L. Sun, "Isolated seven-coordinate Ru(IV) dimer complex with [HOHOH](−) bridging ligand as an intermediate for catalytic water oxidation." J. Am. Chem. Soc. 131, 10397-10399 (2009).

L. Duan, Y. H. Xu, L. P. Tong, L. Sun, "CeIV- and light-driven water oxidation by [Ru(terpy)(pic)3]2+ analogues: catalytic and mechanistic studies." ChemSusChem 4, 238-244 (2011).

J. F. Hull et al., "Highly active and robust Cp* Iridium complexes for catalytic water oxidation." J. Am. Chem. Soc. 131, 8730-8731 (2009).

Y. Zhao et al., "Improving the efficiency of water splitting in dye-sensitized solar cells by using a biomimetic electron transfer mediator." Proc. Nat. Acad. Sci., U.S.A. 109, 15612 (2012).

* cited by examiner

A

B

SOLAR WATER SPLITTING IN A MOLECULAR PHOTOELECTROCHEMICAL CELL

RELATED APPLICATIONS

This application claims the benefit under 35 U.S.C. § 119(e) of U.S. Provisional Patent Application No. 61/875,015, filed Sep. 7, 2013, entitled, "SOLAR WATER SPLITTING IN A MOLECULAR PHOTOELECTROCHEMICAL CELL," the disclosure of which is incorporated herein by reference in its entirety.

STATEMENT REGARDING FEDERALLY SPONSORED RESEARCH OR DEVELOPMENT

This invention was made with government support under Grant Nos. DE-SC0001011 and DE-FG26-08NT01925 awarded by the Department of Energy. The U.S. government has certain rights in the invention.

FIELD OF INVENTION

This invention relates to converting light into storable chemical energy, and to doing useful reactions using light. Specifically, in one embodiment, solar water splitting into $H_2$ and $O_2$ with visible light has been achieved by a molecular assembly and a core-shell nanostructure in a dye-sensitized photoelectrosynthesis cell.

BACKGROUND OF THE INVENTION

Photosynthesis uses the energy of the sun with water as the reducing agent to drive the reduction of carbon dioxide to carbohydrates with oxygen as a co-product through a remarkably complex process. At photosystem II (PSII), a subsystem imbedded in the thylakoid membrane where $O_2$ is produced, light absorption, energy migration, electron transfer, proton transfer, and catalysis are all utilized in multiple stepwise chemical reactions which are carefully orchestrated at the molecular level.

Photosynthesis solves the problem of energy storage by biomass production but with low solar efficiencies, typically <1%. In artificial photosynthesis with solar fuels production, the goal is similar but the targets are either hydrogen production from water splitting, reaction 1, or reduction of carbon dioxide to a carbon-based fuel, reaction 2. Different strategies for solar fuels have evolved. In one, direct bandgap excitation of semiconductors creates electron-hole pairs which are then used to drive separate half reactions for water oxidation ($2H_2O \rightarrow O_2 + 4H^+ + 4e^-$) and water/proton reduction ($2H^+ + 2e^- \rightarrow H_2$).

$$2H_2O + 4h\nu \rightarrow O_2 + 2H_2 \quad (1)$$

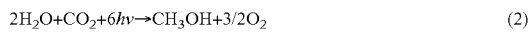

$$2H_2O + CO_2 + 6h\nu \rightarrow CH_3OH + 3/2 O_2 \quad (2)$$

SUMMARY OF THE INVENTION

Here, we report a hybrid strategy for solar water splitting, the Dye Sensitized Photoelectrosynthesis Cell (DSPEC). It combines the electron transport properties of semiconductor nanocrystalline thin films with molecular-level reactions. In this approach, a "chromophore-catalyst" molecular assembly acts as both light absorber and catalyst. It is bound to the surface of a "core/shell", nanostructured, transparent conducting oxide film. In one instance of the present invention, the core structure consists of a nanoparticle film of, for example, tin-doped indium oxide, nanoITO, or antimony-doped tin oxide, nanoATO, deposited on a suitable substrate such as fluoride-doped tin oxide (FTO) glass substrate. The shell in one embodiment consists of a conformal $TiO_2$ nanolayer applied by atomic layer deposition (ALD). The resulting "photoanode", where water oxidation occurs, is connected via an external circuit to for example a Pt cathode for proton reduction to complete the water splitting cell.

Accordingly, some embodiments of the present invention relate to a photoharvesting complex comprising:
    a transparent conductive metal oxide core;
    a metal oxide shell;
    a first molecule chromophore; and
    a second molecule catalyst.

Additional embodiments of the present invention relate to an electrode comprising a photoharvesting complex comprising:
    a transparent conductive metal oxide core;
    a metal oxide shell;
    a first molecule chromophore; and
    a second molecule catalyst.

Further embodiments of the present invention relate to dye-sensitized photoelectrosynthesis cell comprising a photoharvesting complex comprising:
    a transparent conductive metal oxide core;
    a metal oxide shell;
    a first molecule chromophore; and
    a second molecule catalyst. As can be appreciated, the dye-sensitized photoelectrosynthesis cell comprises a photoanode electrode comprising at least one photoharvesting complex. The electrode is in electronic communication via an external circuit with a cathode. The electrode and the cathode are in ionic communication via an electrolyte.

Still additional embodiments of the present invention relate to methods for making a photoharvesting complex, comprising:
providing a transparent conductive metal oxide core;
depositing on the core a metal oxide shell; and
attaching a first molecule chromophore to the metal oxide shell;
reacting, before or after the attaching, the first molecule chromophore with a second molecule catalyst to bond the chromophore to the catalyst.

Yet another set of embodiments relate to methods of converting light into storable chemical energy, comprising:
exposing the photoharvesting complex of any one of claims 1-20 to light in a photoelectrosynthetic cell for a time sufficient to drive a light-driven reaction at the catalyst with at least one reactant such as water. In other cases, the reactant comprises a carbon-containing substance such as carbon dioxide.

DETAILED DESCRIPTION

Figure 1:
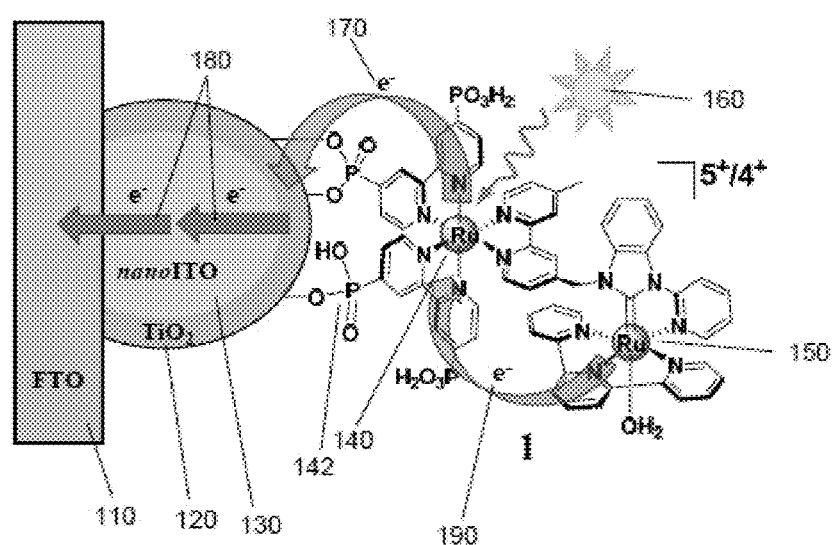
FIG. 1 shows schematically a photoharvesting complex according to one embodiment of the present invention. NanoITO provides a transparent conductive metal oxide core; $TiO_2$ forms a metal oxide shell; a first molecule chromophore comprises a Ru-centered dye absorbing sunlight; and a second molecule catalyst comprises a Ru-centered molecule ready to catalyze the oxidation of water.

As required, detailed embodiments of the present invention are disclosed herein; however, it is to be understood that the disclosed embodiments are merely exemplary of the invention that may be embodied in various forms. The figures are not necessarily to scale, and some features may be exaggerated to show details of particular components. Therefore, specific structural and functional details disclosed herein are not to be interpreted as limiting, but merely as a basis for the claims and as a representative basis for teaching one skilled in the art to variously employ the present invention.

As stated above, some embodiments of the present invention relates to a photoharvesting complex comprising a transparent conductive metal oxide core; a metal oxide shell; a first molecule chromophore; and a second molecule catalyst. The transparent conductive metal oxide core can be chosen from any suitable material. For example, the transparent conductive metal oxide core is chosen from tin-doped indium oxide (ITO), fluorine-doped tin oxide (FTO), antimony tin oxide (ATO), gallium zinc oxide (GZO), indium zinc oxide (IZO), copper aluminum oxide, fluorine-doped zinc oxide, and aluminum zinc oxide, and combinations thereof. Certain instances provide a transparent conductive metal oxide core comprising tin-doped indium oxide (ITO), antimony tin oxide (ATO), or a combination thereof. In some cases, the transparent conductive metal oxide core comprises nanoparticles of a transparent conductive metal oxide. Those nanoparticles can have any suitable size. In some cases, the nanoparticles have an average size of less than about 1 μm, less than about 50 nm, less than about 25 nm, or less than about 10 nm. Similarly, the metal oxide shell can be chosen from any suitable material. In some cases, the metal oxide shell is chosen from SnO$_2$, TiO$_2$, Nb$_2$O$_5$, SrTiO$_3$, Zn$_2$SnO$_4$, ZrO$_2$, NiO, Ta-doped TiO$_2$, Nb-doped TiO$_2$, and combinations thereof. Certain instances provide a metal oxide shell comprising TiO$_2$. The metal oxide shell can have any suitable thickness. In certain cases, the metal oxide shell has a thickness not greater than about 50 nm, greater than about 20 nm, not greater than about 10 nm, or not greater than about 5 nm. The core and the shell may be referred to as a core/shell.

Any suitable chromophore and catalyst can be used in the various embodiments of the present invention. Together, they can be described as a chromophore-catalyst assembly. In some cases, the first molecule chromophore is chosen from ruthenium coordination complexes, osmium coordination complexes, copper coordination complexes, porphyrins, phythalocyanines, and organic dyes, and combinations thereof. In further cases, wherein the second molecule catalyst is chosen from transition metal catalysts. Suitable transition metal catalysts include, but are not limited to iron catalysts, ruthenium catalysts, osmium catalysts, and combinations thereof.

The various components of the photoharvesting complexes, electrodes, dye-sensitized photoelectrosynthesis cells, and other embodiments can be made in any suitable fashion. For example, nanoparticles of a transparent conductive metal oxide core can be deposited on a suitable substrate, followed by formation of a metal oxide shell thereon. Substrates include any suitable material. In some cases, the substrate comprises glass, metal, conductive metal oxide, or combinations thereof. In further cases, the substrate is transparent. The metal oxide shell can be formed by any suitable method, such as, for example, atomic layer deposition or chemical deposition. The first molecule chromophore, second molecule catalyst, or optionally a chromophore-catalyst assembly containing both molecules can then contact the metal oxide shell in any suitable manner. In some cases, one or more linking groups such as carboxylate groups, phosphate groups, or combinations thereof, bond to the metal oxide shell, thereby anchoring the molecule to the shell. The nature of the bond between the linking group in the metal oxide shell is not important. It can be a covalent bond, an ionic bond, or a bond having characteristics of both a covalent bond and an ionic bond.

A diagram for one embodiment of the photoanode in the DSPEC device is shown in FIG. 1. It illustrates the interface binding and the structure of a first molecule chromophore and a second molecule catalyst in a chromophore-catalyst assembly, 1, [(PO$_3$H$_2$)$_2$bpy)$_2$Ru$_a$(4-Mebpy-4'-bimpy)Ru$_b$(tpy)(OH$_2$)]$^{4+}$ ((PO$_3$H$_2$)$_2$bpy is 4,4'-bisphosphonato-2,2'-bipyridine; 4-Mebpy-4'-bimpy is 4-(methylbipyridin-4'-yl)-N-benzimid-N'-pyridine; tpy is 2,2':6',2"-terpyridine)) on core/shell nanoITO/TiO$_2$. Without wishing to be bound by theory, FIG. 1 also illustrates the dynamic events that are believed to occur at the derivatized interface following light absorption by the surface-bound chromophores followed by Metal-to-Ligand Charge Transfer (MLCT) excitation of the chromophore in the assembly 1. Excitation of the chromophore is followed by electron injection, electron migration through the core/shell structure, and intra-assembly electron transfer oxidation of the catalyst.

Specifically, in FIG. 1, a nanoparticle of tin-doped indium oxide (nanoITO) has formed a transparent conductive metal oxide core 130 on a fluorine-doped tin oxide substrate (FTO) 110. A thin layer of titanium dioxide (TiO$_2$) has formed a metal oxide shell 120 on the transparent conductive metal oxide core 130. Chromophore-catalyst assembly 1, comprising a first molecule chromophore 140 and a second molecule catalyst 150 is attached by phosphate linker groups 142 to the metal oxide shell 120. Light, such as from the sun 160, is absorbed by the chromophore 140 to achieve an MLCT excited state that injects an electron 170 into the conduction band of the metal oxide shell 120. The injected electron 170 rapidly undergoes transfer to the transparent conductive metal oxide core 130 and to the substrate 110. The catalyst 150 transfers an electron 192 the chromophore 140, whereupon the catalyst 150 can oxidize water.

Given the relative sizes of the chromophores, catalysts, and core/shells, it can be appreciated that more than one chromophore, catalyst, and/or chromophore-catalyst assembly can attach to a given core/shell. Accordingly, a "photoharvesting complex," as used herein, can share a core/shell with a plurality of other photoharvesting complexes.

Synthesis, characterization and water oxidation catalysis by assembly 1 on nanoITO, abbreviated as nanoITO-$[Ru_a^{II}—Ru_b^{II}OH_2]^{4+}$, have been investigated. The mechanism, without wishing to be bound by theory, which has been established earlier for single-site molecular catalysts, is shown in Scheme 1. Oxidative activation by stepwise $3e^-/2H^+$ oxidation of the catalyst gives the intermediate nanoITO-$[Ru_a^{III}—Ru_b^{IV}O]^{5+}$ which is reactive toward water oxidation. It undergoes rate limiting O-atom transfer to a water molecule in the surrounding solvent to give the peroxide intermediate, nanoITO-$[Ru_a^{II}—Ru_b^{II}—OOH]^{4+}$. This intermediate undergoes further oxidation and loss of $O_2$ and re-enters the catalytic cycle. In Scheme 1, RDS denotes the rate determining step.

Scheme 1. Mechanism of water oxidation by 1 in FIG. 1 in 0.1M $HClO_4$.

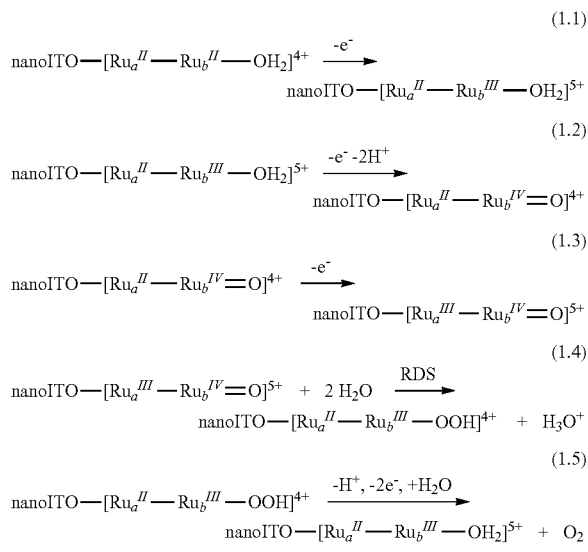

Figure 2:
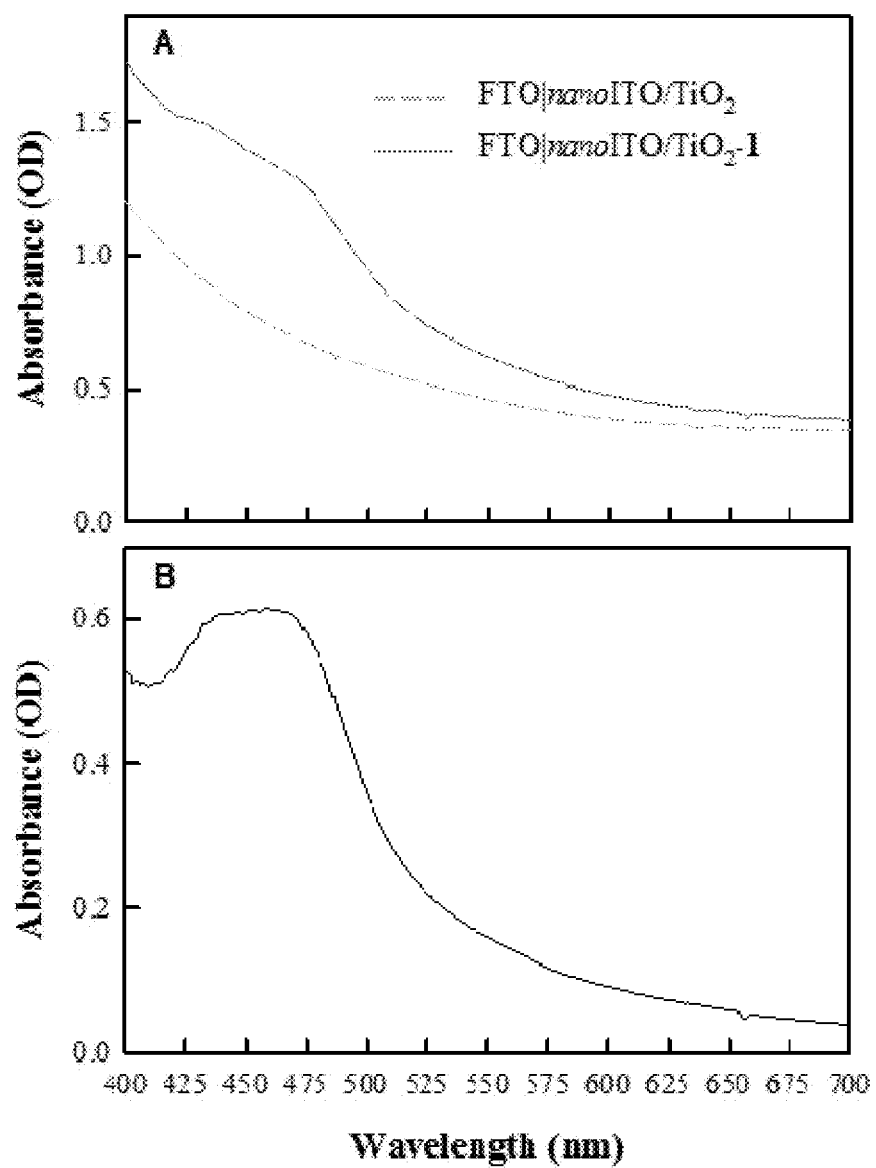
FIG. 2 shows the absorption spectrum of a surface-bound assembly according to another embodiment of the present invention.

As illustrated in FIG. 1, on oxide semiconductor surfaces, Metal-to-Ligand Charge Transfer (MLCT) excitation of the chromophore in 1 results in excited state formation and electron injection into the conduction band of the semiconductor, eq 3. The absorption spectrum of the surface-bound assembly is shown in FIG. 2. The absorption spectrum is dominated in the visible region by an absorption at $\lambda_{max}=450$ nm with $\varepsilon \sim 19,000$ $M^{-1}cm^{-1}$ (pH dependent) arising from overlapping Metal-to-Ligand Charge Transfer (MLCT) absorptions at the chromophore and, to a lesser degree, at the catalyst. Panel A of FIG. 2 shows visible absorption spectra for blank and $[Ru_a^{II}—Ru_b^{II}—OH_2]^{4+}$-derivatized ALD deposited 3.6 nm $TiO_2$ coated nanoITO on FTO electrodes immersed in pH 4.6, 20 mM acetate/acetic acid buffer, 0.5 M $LiClO_4$ solution: blank (dashed line), 1 (solid line). These spectra were collected using air as the reference. Panel B shows background-corrected visible absorption spectrum for FTO|nanoITO/$TiO_2$—1 calculated from spectra in panel A.

Nanosecond transient absorption measurements on 1 and the model chromophore, $[Ru(4,4'\text{-}(PO_3H_2bpy)(bpy)_2]^{2+}$ (RuP) in the core/shell nanoITO/$TiO_2$ structure depicted in FIG. 1, in 0.1 M $HClO_4$ with excitation at 425 nm and monitoring at 450 nm, show that injection and intra-assembly electron transfer, eq 3, occur within 20 nsec after the laser pulse. Recovery of the bleach at 450 nm following the laser flash by back electron transfer, eq 4, occurs with complex kinetics (table S1) as observed previously for related surface-bound complexes on $TiO_2$, but, for the model, on a noticeably longer average timescale.

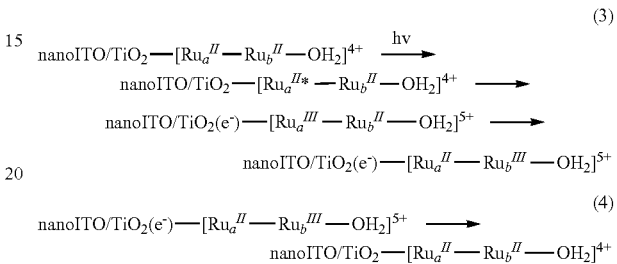

The reaction sequence in eqs 3 and 4, the mechanism of water oxidation by the assembly in Scheme 1, and the microscopic events illustrated in FIG. 1 reveal the underlying challenges to efficient DSPEC water splitting: 1) Three single photon, single electron excitation events are required for a single oxidative activation cycle to reach the key precursor intermediate, $[Ru_a^{III}—Ru_b^{IV}=O]^{5+}$.2) Under ambient sunlight in the nanostructured films, the rate of solar insolation is 1-2 $s^{-1}$ which limits the rate of water oxidation to 0.25-0.5 $s^{-1}/O_2$ given the stoichiometry of the reaction. With back electron transfer occurring on a timescale of μsec to msec, and three injection/oxidation cycles required to activate the catalyst, its reactive form is present in trace amounts under ambient solar illumination and efficiencies for water splitting are negligible. Photolysis of assembly 1 on mesoscopic thin films of $TiO_2$ results in negligible photocurrents above background.

There are several competing processes at the photoanode that dictate cell performance toward water splitting following injection. One is back electron transfer. Another is the rate of transport of injected electrons to the underlying FTO collector electrode. For a microns-thick $TiO_2$ mesoscopic film typically used in such applications, transport of the injected electrons occurs on the msec timescale. Achieving high DSPEC efficiencies requires either decreasing the rate of back electron transfer to the assembly or the electron transit time through the nanostructured film to the FTO electrode.

We report here, in one embodiment of the invention, a "core/shell" approach based on the latter. Unexpectedly, our core/shell approach overcomes unfavorable interfacial electron transfer kinetics by greatly decreasing the dimension of the $TiO_2$ layer while preserving light absorption, in some embodiments. In this approach, a thin layer of $TiO_2$ is formed by Atomic Layer Deposition (ALD) on the outside of an optically transparent nanoITO or nanoATO (generically nanoTCO) substrate. The latter are transparent conducting oxide (TCO) materials whose preparations and properties are described elsewhere.

Figure 3:
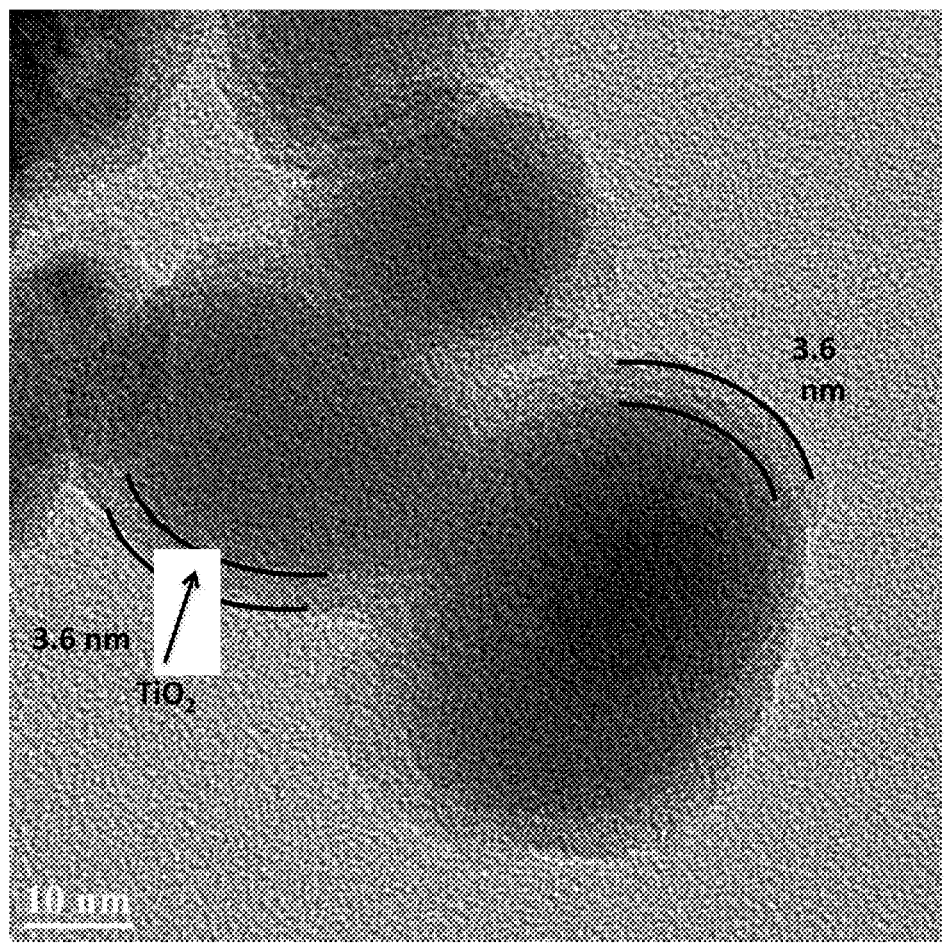
FIG. 3 shows a transmission electron micrograph of a core/shell structure in a further embodiment.

FIG. 3 shows a transmission electron micrograph (TEM) of a core/shell structure consisting of a 3.6 nm layer of $TiO_2$ on a 3.2 micron thick nanoITO film with individual ITO nanoparticles 40-50 nm in diameter. For these experiments, the core/shell nanoITO/TiO$_2$ structure was prepared by 60 ALD cycles at 0.06 nm/cycle to give the outer 3.6 nm shell. In these thin TiO$_2$ shells, rapid electron injection and slow electron transport continue to occur. However, at these dimensions, the transit time through the semiconductor to the conductive nanoTCO core is greatly decreased with injected electrons quickly reaching the nanoITO core. Electrons injected into the outer TiO$_2$ layer are transported rapidly to the FTO collector electrode for transmission through the external circuit to the cathode for H$_2$ production. Stepwise excitation-injection cycles build up the multiple oxidative equivalents at the catalyst at the photoanode for oxidation of water to O$_2$.

The photo-driven equivalent of Scheme 1 is shown in Scheme 2. Under the conditions of the photolysis experiments (pH 4.6, 20 mM acetate/acetic acid buffer, 0.5 M LiClO$_4$) oxidation of —Ru$_b^{II}$—OH$_2^{2+}$ to Ru$_b^{III}$—OH$_2^{3+}$, with p$K_{a,1}$=4.4, is followed by loss of a proton to give —Ru$_b^{III}$—OH$^{2+}$.

Scheme 2. DSPEC
water splitting with 1 onFTO|(core/shell)nanoITO/TiO$_2$
in pH 4.6, 20 mM acetate/acetic acid buffer, 0.5M LiClO$_4$.

(2.1)

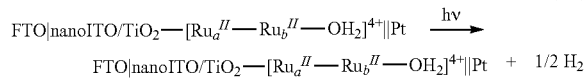

(2.2)

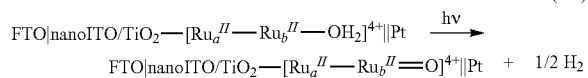

(2.3)

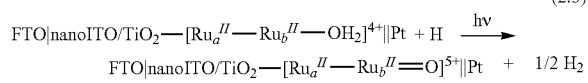

(2.4)

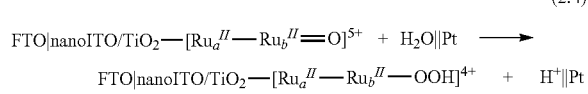

(2.5)

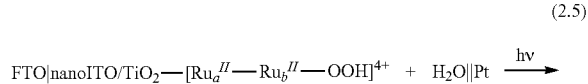

H$_2$ Evolution and Photocurrent Measurements

Figure 4:
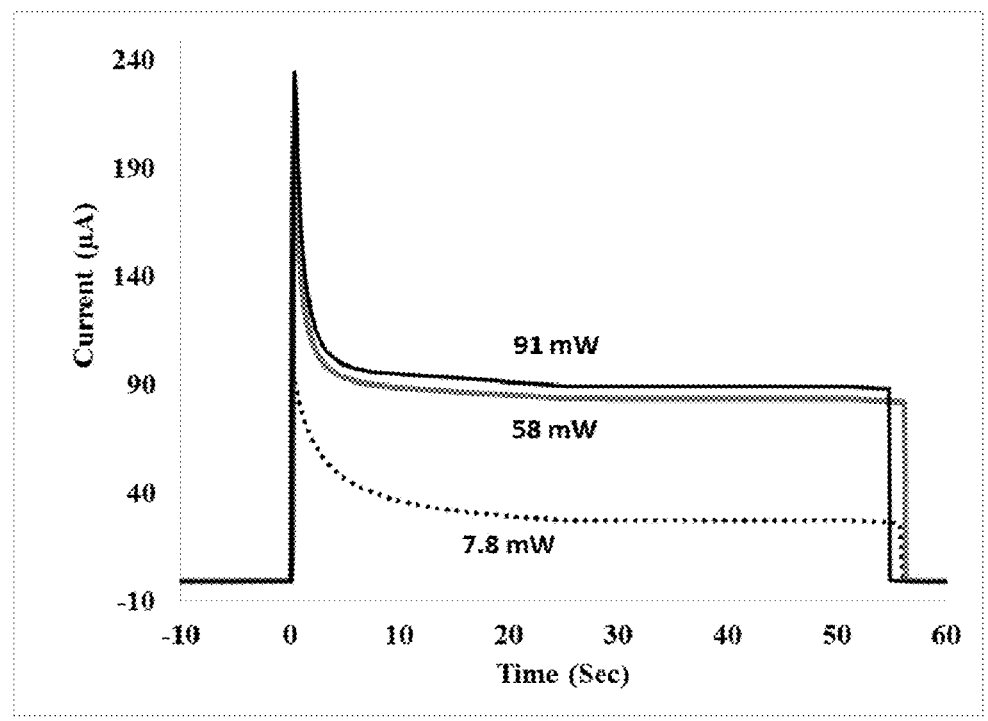
FIG. 4 shows current versus time for a photoelectrochemical cell having a FTO|nanoITO/TiO$_2$—[Ru$_a^{II}$—Ru$_b^{II}$—OH$_2$]$^{4+}$ core-shell photoanode and Pt wire as cathode.

FIG. 4 shows the results of short term, current-time (i-t) measurements at the photoanode of a photoelectrochemical cell (PEC) in pH 4.6, 0.5 M LiClO$_4$, 20 mM acetate/acetic acid buffer with 445 nm photolysis. The cell consisted of a FTO|nanoITO/TiO$_2$—[Ru$_a^{II}$—Ru$_b^{II}$—OH$_2$]$^{4+}$ core-shell photoanode and Pt wire as cathode. The photocurrent was maximized with an applied bias of 0.20 V vs NHE to match the potential for hydrogen evolution at the cathode. Integrated light intensities under the conditions of the experiment ranged from <10% to >90% of ambient sunlight at 100 mW/cm$^2$. The photoelectrochemical experiments shown in FIG. 4 were performed at 22±1° C. using assembly 1 on a 3.6 nm TiO$_2$ shell formed by ALD on nanoITO coated FTO electrodes immersed in pH 4.6, 20 mM acetate/acetic acid buffer (0.5 M in LiClO$_4$) as a function of 445 nm light intensity: 91 mW (solid black line), 58 mW (solid grey line), 7.8 mW (dotted line). Experiments were performed in the presence of air with 0.2 V vs. NHE applied voltage bias. Counter electrode: Pt wire; Reference electrode: Ag/AgCl (3 M NaCl; 0.207 V vs. NHE). Negligible photocurrents were observed under the same conditions for the assembly on TiO$_2$.

Figure 5:
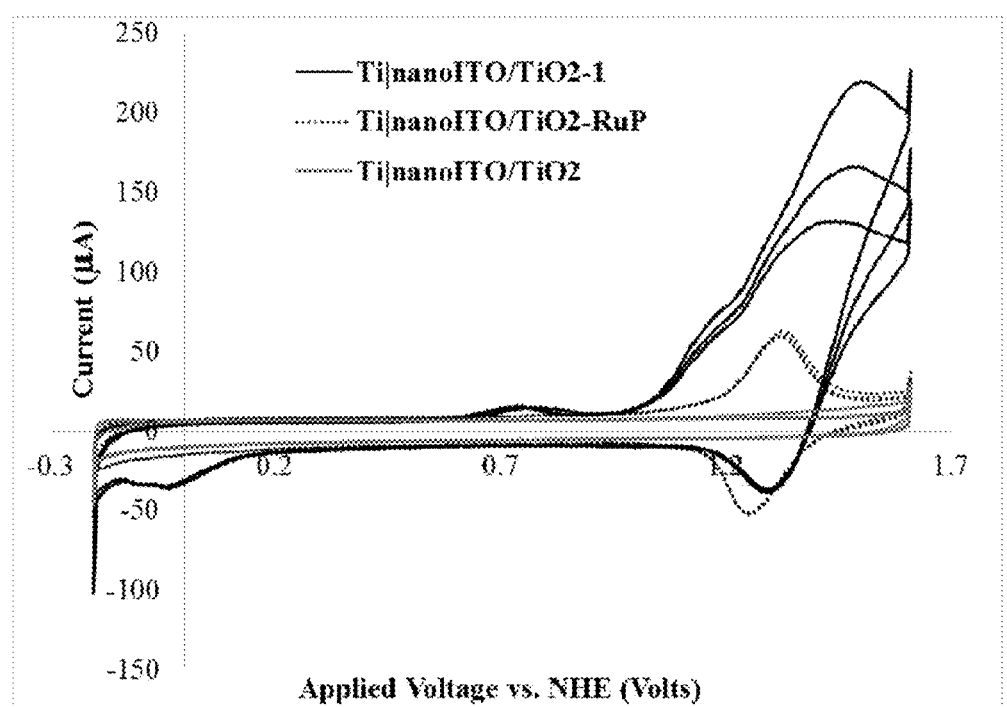
FIG. 5 shows cyclic voltammograms (CV) for 1-, RuP—, and un-derivatized core/shell nanoITO/TiO$_2$ electrodes at pH 4.6 with added 20 mM acetate/acetic acid buffer in 0.5 M LiClO$_4$ as electrolyte.

FIG. 5 shows cyclic voltammograms (CV) for 1-, RuP—, and un-derivatized core/shell nanoITO/TiO$_2$ electrodes at pH 4.6 with added 20 mM acetate/acetic acid buffer in 0.5 M LiClO$_4$ as electrolyte at 22±1° C. The solution was purged with nitrogen gas for 20 minutes just prior to experiments with the headspace continuously purged with nitrogen during experiments. Scan Rate: 0.020 V/s; Counter electrode: Pt coil; Reference electrode: Ag/AgCl (4 M KCl, 0.199 V vs. NHE). The area of the modified Ti working electrode was 0.196 cm$^2$. RuP is the monomeric model [Ru(4,4'-(PO$_3$H$_2$bpy)(bpy)$_2$]$^{2+}$.

Figure 6:
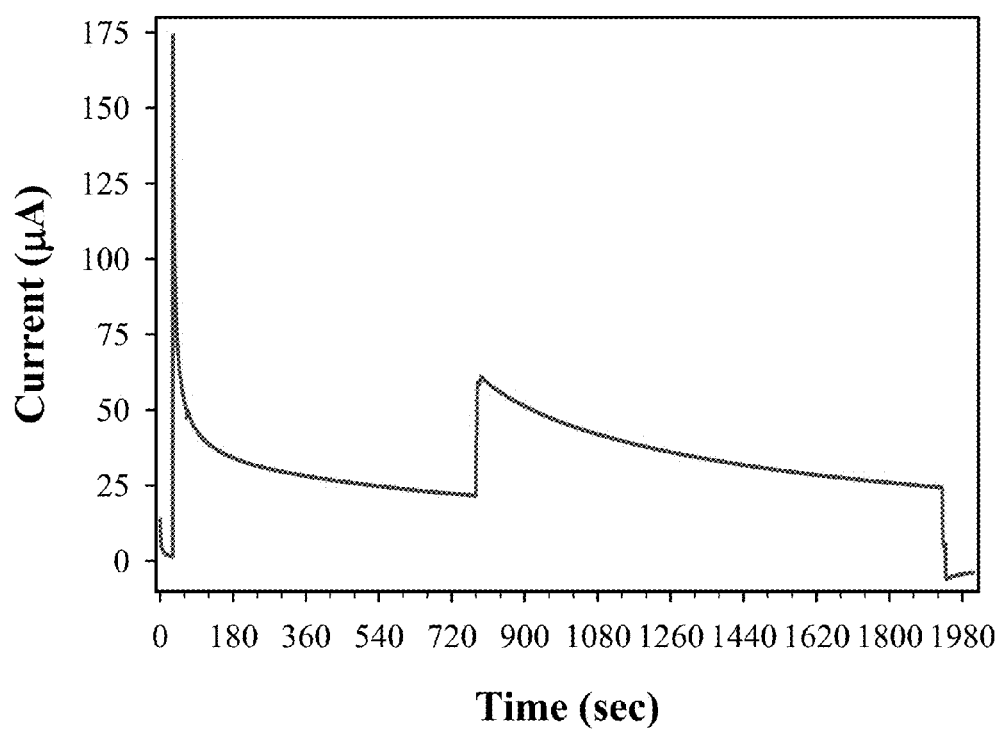
FIG. 6 shows the current-time behavior of an additional embodiment of the present invention.
Figure 7:
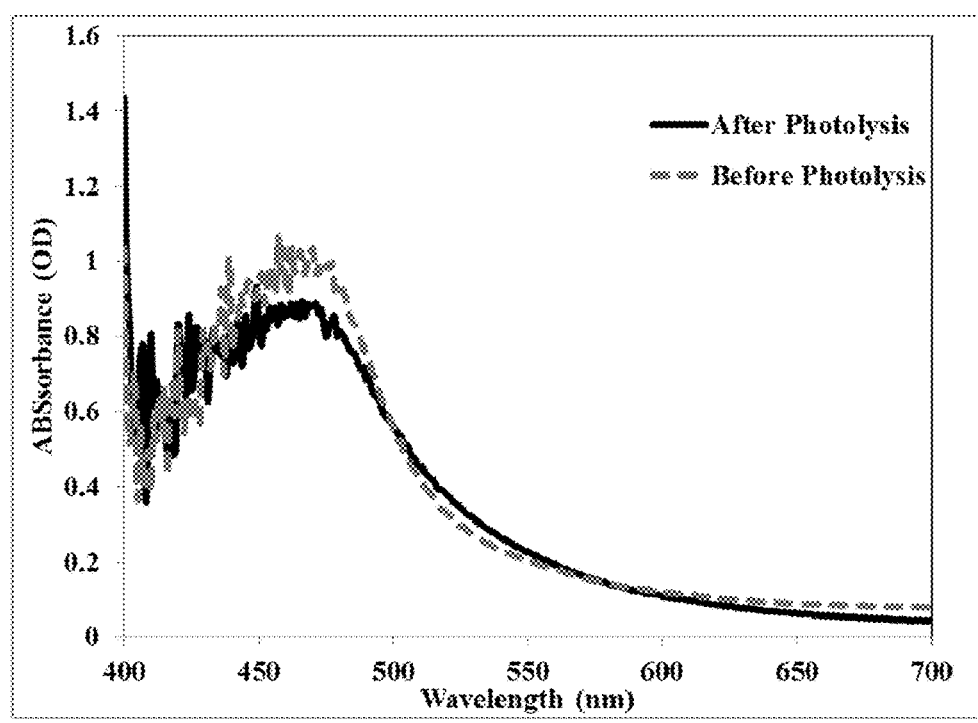
FIG. 7 shows the absorption spectra before and after photolysis of a further embodiment.

FIG. 6 shows the current versus time behavior of the photoanode over a photolysis period of 30 minutes with 445 nm (FWHM ~20 nm) irradiation. In this experiment, evolution of H$_2$ at the cathode was measured by immersing FTO|nanoITO/TiO$_2$-1 in aqueous pH 4.6 solution (20 mM acetate/acetic acid buffer, 0.5 M LiClO$_4$) at 22±1° C. under light illumination (Lumencor, Inc.; model Spectra; $\lambda_{max}$=445 nm, 20 nm FWHM, output: 12.3 mW or 58 mW; beam diameter: 0.8 cm) and applied voltage bias (0.2 V vs. NHE). Counter electrode: Pt mesh; Reference electrode: Ag/AgCl filled with 3 M NaCl (0.207 V vs. NHE). as described in the supplementary materials. Over the course of the experiment, the current decreased from 175 µA to 20 µA. Based on the light absorbed by the assembly at the excitation wavelength, the absorbed photon conversion efficiency (APCE) was 4.4% calculated at peak photocurrent. The estimated Faradaic efficiency for H$_2$ production was ~86%. The decrease in photocurrent with time is currently under investigation and appears to arise from an instability toward ligand substitution in the Ru(III) form of the chromophore in the assembly, TiO$_2$—[Ru$_a^{III}$—]$^{3+}$. Note the change in absorption spectrum before and after photolysis in FIG. 7, which shows UV-visible spectra for FTO|nanoITO/TiO$_2$—1 before and after 30 min photoelectrochemical experiment from FIG. 5. Spectra are corrected for FTO|nanoITO/TiO$_2$ absorbance.

O$_2$ Measurements

A modified version of the rotating ring-disk electrode (RRDE) technique was used to measure O$_2$. The RRDE technique was used to establish rates and stoichiometries of water oxidation by nanoITO-[Ru$_a^{II}$—Ru$_b^{II}$—OH$_2$]$^{4+}$, note Scheme 1. In the RRDE experiments, a nanoparticle film of nanoITO was deposited on the glassy carbon disk of the RRDE electrode assembly by drop casting. In this experiment, oxygen generated at the disk during oxidative scans is detected at the ring by reduction of oxygen to water.

Figure 8:
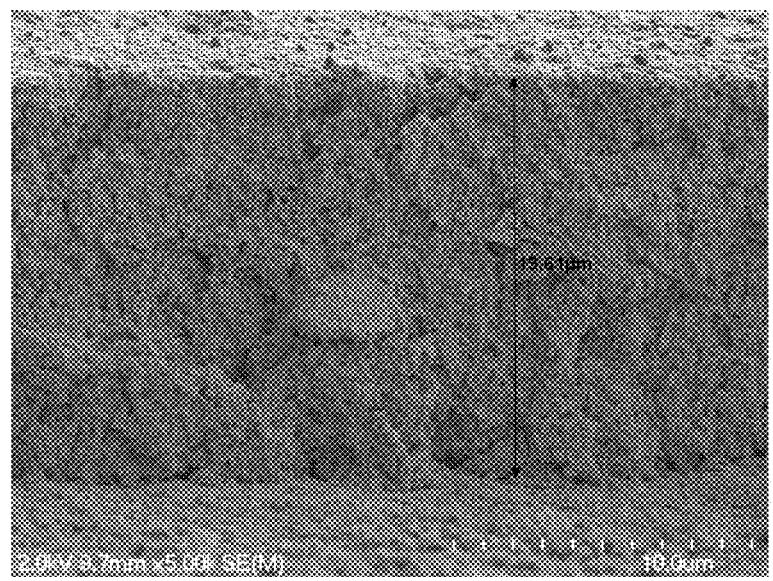
FIG. 8 schematically illustrates a disk electrode arrangement and a core/shell nanostructured transparent conducting oxide film, and their operation as a photoanode.
Figure 8:
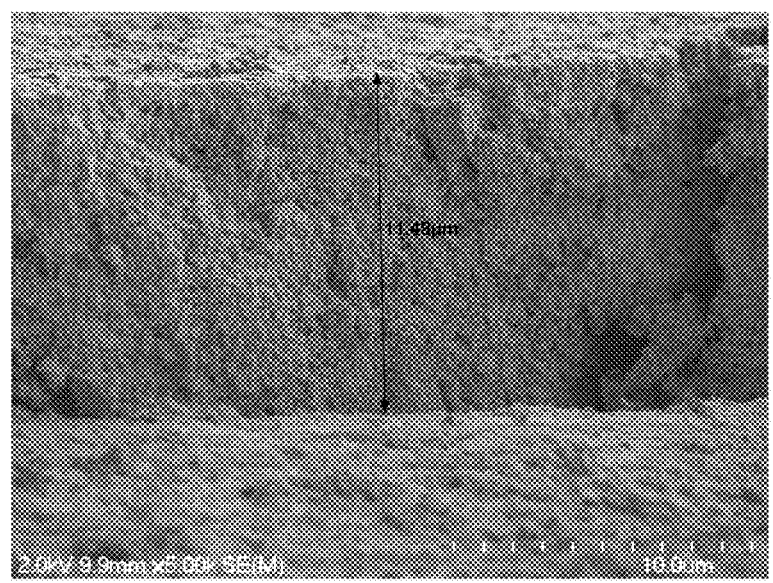

For the photo-RRDE experiment, we replaced the commercially available glassy carbon disk electrode with a modified titanium disk. Electrode preparation is reported below and is illustrated in FIG. 8. After depositing a nanoTCO (ITO or ATO) layer onto the Ti disk, a 3.6 nm TiO$_2$ overlayer was deposited by Atomic Layer Deposition (ALD) resulting in a nanoTCO (core)/TiO$_2$(shell) nanostructure. ALD produced a uniform shell of TiO$_2$ on the nanoTCO core; note the TEM image in FIG. 3. CV measurements revealed the existence of a significant capacitance background in the resulting electrodes since it was not possible to anneal the final structures.

Figure 9:
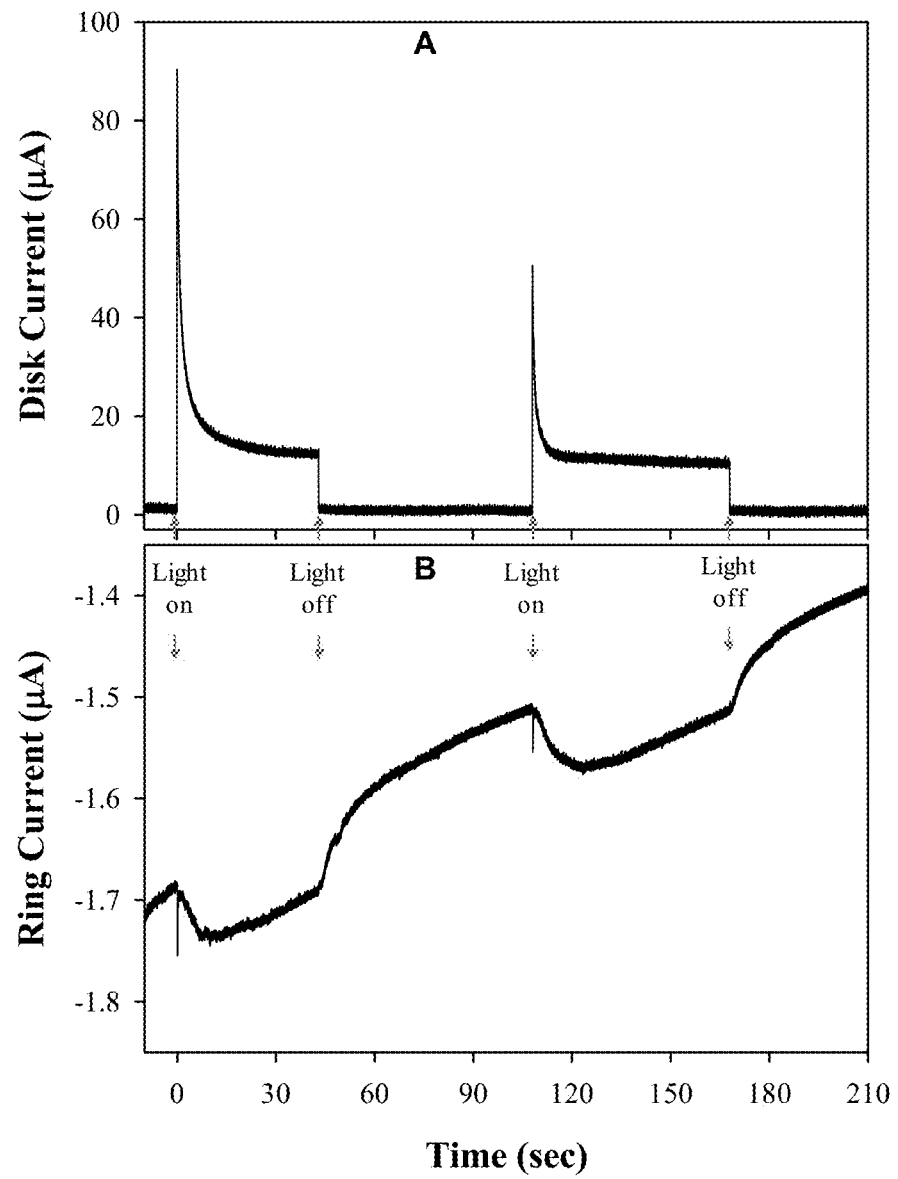
FIG. 9 shows the results of a photo-RRDE experiment on a core/shell FTO|nanoATO/TiO$_2$-1 electrode.

The results of a photo-RRDE experiment on a core/shell FTO|nanoATO/TiO$_2$—1 electrode are shown in FIG. 9. As noted above, the current at the disk arises from the 4e$^-$ oxidation of water ($2H_2O \rightarrow O_2 + 4H^+ + 4e^-$) and the current in the Pt ring from reduction of $O_2$ to $H_2O$ after it is formed, $O_2 + 4H^+ + 4e^- \rightarrow 2H_2O$. When the RRDE assembly is rotating (500 rpm), the appearance of current at the ring demonstrates $O_2$ production at the disk. FIG. 9 shows the current response of the photo-RRDE disk and Pt ring electrodes at pH 4.6, 20 mM acetate/acetic acid buffer (0.5 M $LiClO_4$) with assembly 1 on the surface of a 3.6 nm $TiO_2$ shell deposited by ALD onto a nanoATO-coated Ti disk electrode. The rotation rate of the RRDE electrode assembly was 500 rpm. The applied voltage at the disk was held at 1 V while the potential at the platinum ring electrode was held at −0.35 V for $O_2$ detection (V vs. Ag/AgCl 4 M KCl reference, 0.199 V vs. NHE). Illumination was provided by the continuous output of a 473 nm DPSS laser (3.3 mW, LaserGlow model LRS-0473-PFM-00100-03). Light was cycled on or off through electronic TTL triggering of the laser. These experiments do reliably and reproducibly demonstrate the production of $O_2$ at the photoanode in tandem with $H_2$ production at the cathode.

Discussion:

The observations made here, and the use of the core/shell nanoTCO/$TiO_2$ configuration, provide insight about how to exploit chromophore-catalyst assemblies in DSPEC applications. The use of molecular assemblies is appealing since systematic synthetic changes and a "modular approach" can be utilized to obtain desirable properties by rapid iteration. The final output of the DSPEC may be influenced in some embodiments by local interfacial dynamics with a "core/shell advantage" arising from the rapid transit of injected electrons through the thin $TiO_2$ shell to the nanoTCO core for transfer to the cathode.

Initial per photon absorbed quantum efficiencies are 4-5% but with considerable latitude for improvement based on changes in the assembly and solution conditions. The local microscopic dynamics that dictate performance—injection, back electron transfer, competitive light absorption by the catalyst as Ru(II), rate of water oxidation—are all subject to synthetic modification. At low light levels, the cell dynamics are dictated by light absorption (FIG. 4), with evidence for rate limiting water oxidation as the incident intensity is increased. Long term instability of the assembly is being addressed by modifying reaction conditions, the nature of the chromophore, and stabilizing surface binding. The catalyst is stable toward water oxidation for extended periods under the conditions of the experiments.

The core/shell-molecular assembly approach described here offers a general platform for using chromophore-catalyst assemblies and it should open the door to a host of DSPEC applications.

Conclusions:

We report here, in one embodiment, a nanoTCO-core/ALD-shell-chromophore-catalyst assembly for photoelectrochemical water splitting. This is an important discovery which could provide a general platform for a variety of applications in solar fuels, green chemistry, and sensing.

Additional Measurements and Experimental Details:

Transmission Electron Microscopy (TEM).

TEM analysis was performed on a JEOL 2010F FasTEM by applying an accelerating voltage of 200 kV.

ALD Deposition.

Atomic layer deposition was conducted in a custom-built, hot walled, flow tube reactor. Nitrogen (99.999% purity, National Welders) carrier gas flow was metered with a mass flow controller to 300 SCCM and exhausted through a rotary vane pump. Precursor delivery was controlled electronically by a LabVIEW sequencer. Gate valves were positioned on either side of the reaction zone to conduct hold steps. Precursors used for $TiO_2$ deposition were 99% pure $TiCl_4$ (Strem Chemicals) and reagent grade water (Ricca Chemicals). Standard ALD coating conditions were 120° C. and 2 Torr of $N_2$ carrier gas with a sequence of 0.3 s metal precursor dose, 60 s hold, 180 s $N_2$ purge, 0.3 s $H_2O$ dose, 60 s hold, 180 s $N_2$ purge. Under these conditions, the steady-state deposition rate on flat silicon substrates is 0.6 Å/cycle. From TEM analysis, The thickness of $TiO_2$ obtained on nanoITO (FIG. 3) shows a similar growth rate, consistent with uniform and conformal ALD.

Fabrication of nanoTCO|FTO Substrates.

A 3 gram sample of nanoITO (Lihochem, Inc.) or nanoATO (Sigma-Aldrich Co.) powder was added to a mixture of acetic acid (3 g) and ethanol (10 mL) giving a 5 M solution/suspension (22 wt %). After brief manual shaking, this mixture was sonicated for 20 minutes. The colloidal suspension was further sonicated with a Branson ultrasonic horn outfitted with a flat microtip (70% power, 50% duty cycle; 5 minutes). FTO glass substrates, 4 cm×2.2 cm, were prepared and cleaned by sonication in EtOH for 20 min followed by acetone for 20 min. Kapton tape was applied to one edge to maintain a defined area (1 cm×2.5 cm). The nanoTCO colloidal suspension was coated on FTO glass substrates by a spin-coater (600 rpm, 10 s hold). NanoITO slides were annealed under air and then under 5% $H_2$ with a method described previously. NanoATO slides were annealed just under air for 1 hr at 500° C. Annealed films were measured to be 3.2±0.5 μm thick by surface profilometry. Once cooled to room temperature, nanoTCO electrodes were derivatized by overnight (~16 hrs) immersion into 0.1 M $HNO_3$ solutions containing ~$10^{-4}$-$10^{-3}$ M Ru complex (RuP or 1).

Preparation of Ti|nanoTCO/$TiO_2$ Disk Electrodes.

Titanium rod (commercial grade 2, McMaster-Carr Inc., model 89145K13) was machined into 4 mm thick, 5 mm diameter cylinders. After cleaning by sonication in EtOH for 20 min followed by acetone for 20 min, the nanoTCO solution/suspension described above was drop cast onto the flat surface of Ti. The solvent mixture was allowed to evaporate and the modified electrode was annealed under the same conditions as described above. After annealing, the electrodes were subjected to 60 ALD cycles $TiO_2$ to create the core-shell nanostructures, see FIG. 12. The resulting core-shell|Ti electrodes were further derivatized by overnight (~16 hrs) immersion into 0.1 M $HNO_3$ solutions containing ~$10^{-4}$-$10^{-3}$ M Ru complex (RuP or 1). After dye loading, the modified electrodes were assembled as the disk of the Pt ring-disk electrode assembly (Pine Instruments Inc., model AFE6RIPT).

Figure 12:
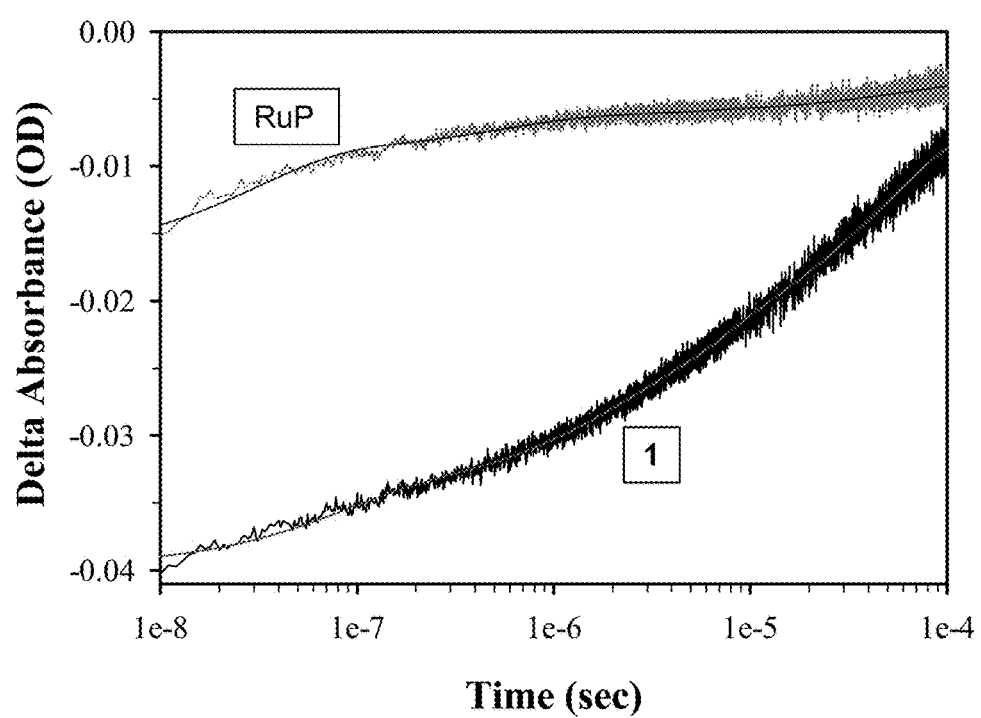
FIG. 12 depicts the kinetics of absorbance changes probed at 450 nm following 3.2 mJ, 425 nm pulsed laser excitation for RuP— and 1-derivatized FTO|nanoITO/TiO$_2$ electrodes.

FIG. 12 shows kinetics of absorbance changes probed at 450 nm following 3.2 mJ, 425 nm pulsed laser excitation for RuP- and 1-derivatized FTO|nanoITO/$TiO_2$ electrodes immersed in argon-degassed, aqueous pH 4.6 solutions with 0.5 M $LiClO_4$ and 20 mM acetate/acetic acid buffer at 22±1° C. The first 10 μs displayed here were collected in a separate experiment from the longer timescale (i.e. out to 400 μs) data for improved data quality. Both data sets are presented together here (RuP and 1 indicated) with the fits shown.

Scanning Electron Microscopy (SEM).

SEM analysis was performed on a FEI Helios 600 Nanolab Dual Beam System by applying an accelerating voltage of 5 kV. Samples were mounted on an aluminum sample holder using double-sided sticky carbon tape. FIG. 8 provides scanning electron microscopy images showing the cross sectional view of a Ti disk electrode surface, modified with films of either (a) nanoITO or (b) nanoATO, and further coated with 3.6 nm of $TiO_2$ applied by ALD. The thickness of the nanoITO and nanoATO films was 13.61 μm and 11.48 μm, respectively, as indicated in the images.

Rotating Ring-Disk Electrode (RRDE).

Rotating ring-disk electrode (RRDE) experiments were performed with a Pine Instruments bipotentiostat (model AFCBP1) and rotator (model AFMSRCE). The working electrode, namely the disk, was the previously described Ti|nanoTCO/$TiO_2$ metal cylinder. The reference electrode, a standard Ag/AgCl electrode filled with 4 M KCl (Pine Instruments, model RREF0021, 0.199 V vs. NHE), was inserted into a double junction reference port consisting of an electrolyte-filled, Vycor-tipped glass tube immersed in the primary electrolyte bath. The double junction was used to avoid chloride contamination of the primary electrolyte. The counter electrode, a platinum wire coil, was placed into an isolated glass tube with fine glass frit separator (Pine Instruments, model AFCTR5). The center of the exposed face of the working disk electrode was illuminated via the light output of a DPSS laser (Laserglow Inc., model LRS-0473-PFM-00100-05, 3.3 mW, 473 nm, 2 mm beam dia.). The laser was cycled on/off by electronic TTL triggering from a pulse generator (Stanford Research Systems Inc., model DG535). Laser output power was determined using a Coherent FieldMax II-TOP power meter and Coherent LM-2 VIS power head.

Figure 10:
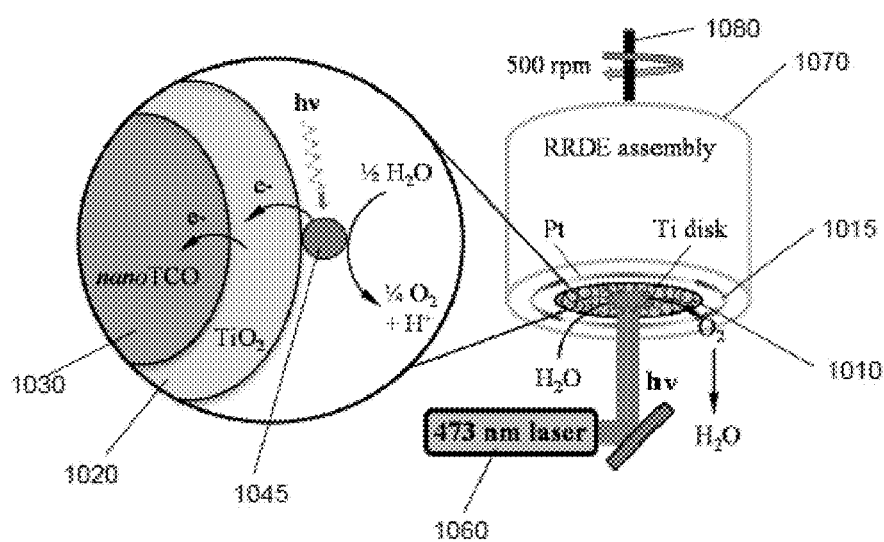
FIG. 10 illustrates the photo-RRDE experiment with a Ti disk and nanoTCO/TiO$_2$ core/shell structure derivatized with —[Ru$_a^{II}$—Ru$_b^{II}$—OH$_2$]$^{4+}$ (1).
Figure 11:
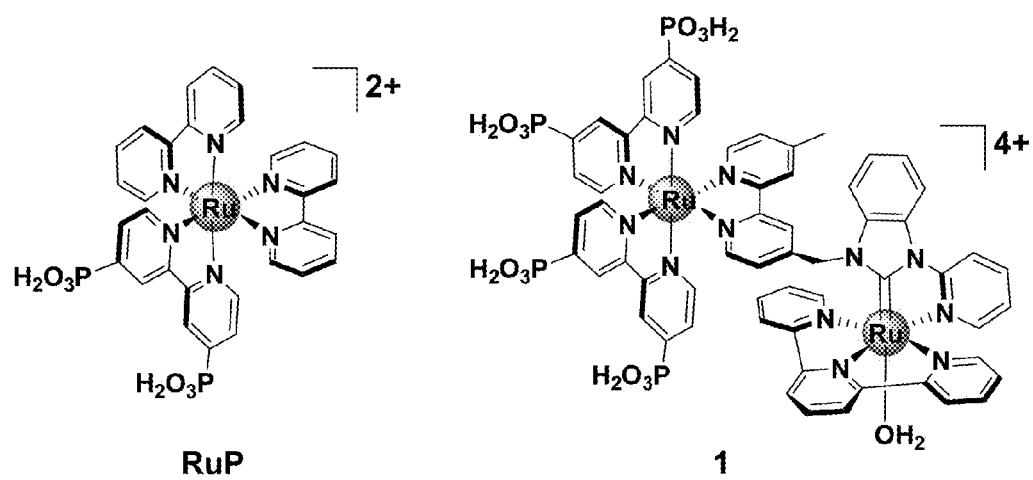
FIG. 11 provides the chemical structures of chromophore RuP and chromophore-catalyst assembly 1.

All RRDE experiments were performed at 22±1° C. by immersing the RRDE electrode assembly in aqueous solutions at pH 4.6 (20 mM acetate/acetic acid buffer, 0.5 M $LiClO_4$) deaerated by bubbling with nitrogen gas for 20 minutes prior to experiments with the headspace continuously purged with nitrogen gas during experiments. The rotation rate of the RRDE electrode assembly was 500 rpm. Linear sweep voltammetry (LSV) experiments in oxygen-saturated solutions were performed by using the platinum ring as the working electrode. FIG. 10 illustrates the photo-RRDE experiment with a Ti disk and nanoTCO/$TiO_2$ core/shell structure derivatized with —$[Ru_a^{II}$—$Ru_b^{II}$—$OH_2]^{4+}$ (1).

In FIG. 10, a nanoparticle of a transparent conductive oxide (nanoTCO) forms a transparent conductive metal oxide core 1030 onto which has been formed a thin layer of titanium dioxide ($TiO_2$), which provides a metal oxide shell 1020. A chromophore-catalyst assembly 1045 adheres to the metal oxide shell 1020. A plurality of cores 1030, shells 1020, and assemblies 1045 adhere to a disk electrode substrate 1010. The disk electrode substrate 1010 is present in the RRDE assembly 1070, as described above. Axis 1080 allows rotation of the RRDE assembly 1070 while laser 1060 illuminates the disk electrode substrate 1010. Platinum counter electrode 1015 and the disk electrode substrate 1010 are in ionic communication via the electrolyte, and are in electronic communication via an external circuit (not shown).

On Quantification of Hydrogen Evolution. Photoelectrochemical experiments to quantify hydrogen generation were performed at 22±1° C. by inserting FTO|nanoTCO/$TiO_2$ electrodes into a custom-built, three-arm, one-compartment pyrex cell. One arm was a 10 mm path length pyrex cuvette (Starna Cells, Inc., model 3-PX-10) with a homemade Teflon block (¼-inch thick), with the top surface slotted diagonally, resting on the bottom which was designed to reproducibly hold FTO photoanodes diagonally with respect to the cuvette path length. The second arm housed the platinum wire counter electrode and a third arm to accommodate the Ag/AgCl reference electrode (3 M NaCl; 0.207 V vs. NHE). Aqueous solutions—either (pH 4.6, 20 mM acetate/acetic acid buffer, 0.5 M $LiClO_4$) or, for the 30 second experiments, (pH 5, 20 mM acetate/acetic acid buffer, 0.1 M $LiClO_4$)—were added to the photoelectrochemical cell such that the active area of the working electrode was completely immersed. Except for the 30 second experiments done in air, the photoelectrochemical cell (PEC) was argon-degassed for 30 minutes prior to experiments and was then sealed using vacuum greased, ground glass stopcocks and Suba-seal septa. Before photoelectrochemical experiments, a gas-tight syringe (VICI) was used to inject a known volume of research grade methane gas (National Welders) into the PEC cell. Voltage bias (0.2 V vs. NHE) was applied to the working electrode using a CHI 601 D electrochemical workstation; the background current at the applied bias was allowed to stabilize before experiments commenced. PEC current measurements for the photoanodes in the dark or under light illumination were recorded also using the CHI 601D. Light illumination was provided by a solid state light source (Lumencor, Inc.; model Spectra; $\lambda_{max}$=445 nm, 20 nm FWHM, output ~7.8-91 mW; beam diameter: 0.8 cm) coupled to a Newport liquid light guide and focusing/imaging beam probe. After photoelectrochemical experiments, a sample of gas above the electrolyte inside the PEC (i.e. from the PEC headspace) was withdrawn for GC analysis using a gas-tight syringe (VICI, 0.5 mL). The headspace gas sample was delivered to a PC-interfaced gas chromatograph (Varian 450-GC) equipped with a 5 Å molecular sieve column and pulsed diskharge helium ionization detector (PDHID) plumbed with ultra-high purity helium carrier gas (National Welders). Evolved hydrogen was quantified relative to the injected methane internal standard. The GC was calibrated with samples containing known concentrations of methane and hydrogen in argon.

Nanosecond Transient Absorption Spectroscopy.

Transient absorption measurements utilized a commercially available laser flash photolysis apparatus (Edinburgh Instruments, Inc., model LP920) with laser excitation (425 nm, 3.2 mJ, 8 mm dia., 5-7 ns FWHM) provided by a pulsed Nd:YAG (Spectra-Physics, Inc., model Quanta-Ray LAB-170-10)/OPO (VersaScan-MB) laser combination. The repetition rate of the laser was matched to the rate at which the probe source was pulsed, (i.e. intensified 50-fold compared to non-pulsed output), typically 1 Hz, although the laser flashlamps were fired at 10 Hz. Timing of the experiment was PC controlled via Edinburgh software (L900). The white light output of the LP920 probe source, a 450 W Xe lamp, was passed through a 400 nm long pass color filter before passing through the sample. The LP920 was equipped with a multi-grating detection monochromator outfitted with a Hamamatsu R928 photomultiplier tube (PMT) in a non-cooled housing and a gated CCD (Princeton Instruments, PI-MAX3). The detector was software selectable with the PMT for monitoring transient absorption kinetics at a single wavelength (10 ns FWHM IRF, reliable data out to 400 μs, 300 nm-900 nm) and the gated CCD for transient spectra covering the entire visible region (400-850 nm) at a given time after excitation with a typical gatewidth of 10 ns. For PMT measurements, spectral bandwidth was typically <5 nm with color filters placed after the sample but before the detection monochromator to eliminate laser scatter. Single wavelength kinetic data were collected by averaging 10-100 sequences where one sequence refers to collection of laser only data followed by pump/probe data. For timescales >10 μs, the probe only data were also collected within the sequence because the strategy of using the linear portion before excitation to extrapolate the light intensity in the absence of the laser pulse was no longer valid due to a nonlinear temporal output of the pulsed probe source when viewed on longer timescales. Kinetic data were analyzed by using SigmaPlot (Systat, Inc.), Origin (OriginLab, Inc.), or L900 (Edinburgh, Inc.) software. Data was collected at room temperature (22±1° C.).

Sample Preparation.

Experiments were performed on samples prepared in the following manner. Derivatized FTO|nanoTCO/TiO$_2$ electrodes (overall FTO slide size: 1.1 cm×4.4 cm×2.2 mm; the nanoTCO/TiO$_2$ film covered a 1.1 cm×1 cm area positioned at the lower end of the face of the slide) were inserted diagonally into a 1 cm path length cuvette that had been modified to incorporate a #15 o-ring joint at the top of the cuvette. Four mL of pH 4.6 (20 mM acetate buffer, 0.5 M LiClO$_4$) solution were then added to the cuvette such that the derivatized portion of the FTO slide was completely immersed. The cuvette was sealed by attaching a separate pyrex piece, via a mating #15 o-ring joint, modified with a sidearm and a Kontes vacuum-rated Teflon valve at the top. An argon (industrial grade, National Welders) degassing station consisting of a homebuilt glass manifold and inline oxygen scrubber, OxiClear model DGP250-R1, was used to bubble oxygen-free, argon gas through the solution via small Teflon tubing inserted through the sidearm for at least 45 minutes just prior to laser experiments to minimize effects due to the presence of oxygen. UV-Visible absorption of samples was monitored before and after laser experiments to track assembly desorption/decomposition.

TABLE 1

Best fit parameters to the tri-exponential decay function shown below obtained from transient absorption kinetic measurements with 450 nm monitoring at 22 ± 1° C. with 3.2 mJ, 425 nm excitation for RuP— and 1-derivatized FTO|nanoITO/TiO$_2$ electrodes immersed in aqueous pH 4.6 solutions with 0.5M LiClO$_4$ and 20 mM acetate/acetic acid buffer. The first 10 μs and first 400 μs were fit separately to independent tri-exponential functions: $\Delta A = A_1 \cdot \exp(-t/\tau_1) + A_2 \cdot \exp(-t/\tau_2) + A_3 \cdot \exp(-t/\tau_3)$. The structures of the surface-bound chromophore, [Ru(4,4'-(PO$_3$H$_2$bpy)(bpy)$_2$]$^{2+}$ (RuP), and assembly, 1, are illustrated below.

| Complex | A$_1$ | τ$_1$ | A$_2$ | τ$_2$ | A$_3$ | τ$_3$ |
|---|---|---|---|---|---|---|
| 10 μs | | | | | | |
| RuP | 0.13 | 75 ns | 0.15 | 1.4 μs | 0.71 | 36 μs |
| 1 | 0.46 | 30 ns | 0.17 | 546 ns | 0.38 | 88 μs |
| 400 μs | | | | | | |
| RuP | 0.28 | 4 μs | 0.36 | 35 μs | 0.36 | 248 μs |
| 1 | 0.43 | 0.5 μs | 0.16 | 46 μs | 0.41 | 812 μs |

REFERENCES

N. Nelson, C. F. Yocum, Structure and function of photosystems I and II. *Annu. Rev. Plant Biol.* 57, 521-565 (2006).

D. J. Vinyard, G. M. Ananyev, G. C. Dismukes, Photosystem II: the reaction center of oxygenic photosynthesis. *Annu. Rev. Biochem.* 82, 577-606 (2013).

J. J. Concepcion, R. L. House, J. M. Papanikolas, T. J. Meyer, Chemical approaches to artificial photosynthesis. *Proc. Nat. Acad. Sci., U.S.A.* 109, 15560-15564 (2012).

D. Gust, T. A. Moore, A. L. Moore, Solar fuels via artificial photosynthesis. *Acc. Chem. Res.* 42, 1890-1898 (2009).

M. G. Walter et al., Solar water splitting cells. *Chem. Rev.* 110, 6446-6473 (2010).

S. Bensaid, G. Centi, E. Garrone, S. Perathoner, G. Saracco, Towards artificial leaves for solar hydrogen and fuels from carbon dioxide. *ChemSusChem* 5, 500-521 (2012).

A. J. Cowan, J. R. Durrant, Long-lived charge separated states in nanostructured semiconductor photoelectrodes for the production of solar fuels. *Chem. Soc. Rev.* 42, 2281-2293 (2013).

G. P. Smestad, A. Steinfeld, Review: photochemical and thermochemical production of solar fuels from H$_2$O and CO$_2$ using metal oxide catalysts. *Ind. Eng. Chem. Res.* 51, 11828-11840 (2012).

Z. Zou, J. Ye, K. Sayama, H. Arakawa, Direct splitting of water under visible light irradiation with an oxide semiconductor photocatalyst. *Nature* 414, 625-627 (2001).

L. Alibabaei et al., Applications of metal oxide materials in dye sensitized photoelectrosynthesis cells for making solar fuels: let the molecules do the work. *J. Mater. Chem. A* 1, 4133-4145 (2013).

M. R. Norris, J. J. Concepcion, Z. Fang, J. L. Templeton, T. J. Meyer, Low overpotential water oxidation by a surface-bound Ruthenium-chromophore-Ruthenium-catalyst assembly. *Angew. Chem. Int. Ed.*, (Submitted).

Z. Chen, J. J. Concepcion, J. W. Jurss, T. J. Meyer, Single-site, catalytic water oxidation on oxide surfaces. *J. Am. Chem. Soc.* 131, 15580-15581 (2009).

J. J. Concepcion, M.-K. Tsai, J. T. Muckerman, T. J. Meyer, Mechanism of water oxidation by single-site Ruthenium complex catalysts. *J. Am. Chem. Soc.* 132, 1545-1557 (2010).

D. L. Ashford et al., Photoinduced electron transfer in a chromophore-catalyst assembly anchored to TiO$_2$. *J. Am. Chem. Soc.* 134, 19189-19198 (2012).

A. Hagfeldt, G. Boschloo, L. Sun, L. Kloo, H. Pettersson, Dye-sensitized solar cells. *Chem. Rev.* 110, 6595-6663 (2010).

M. Gratzel, The artificial leaf, bio-mimetic photocatalysis. *CATTECH* 3, 4-17 (1999).

B. C. O'Regan, J. R. Durrant, Kinetic and energetic paradigms for dye-sensitized solar cells: moving from the ideal to the real. *Acc. Chem. Res.* 42, 1799-1808 (2009).

R. Mohammadpour, Z. A. Iraji, A. Hagfeldt, G. Boschloo, Comparison of trap-state distribution and carrier transport in nanotubular and nanoparticulate TiO$_2$ electrodes for dye-sensitized solar cells. *ChemPhysChem* 11, 2140-2145 (2010).

P. G. Hoertz, Z. Chen, C. A. Kent, T. J. Meyer, Application of high surface area tin-doped indium oxide nanoparticle films as transparent conducting electrodes. *Inorg. Chem.* 49, 8179-8181 (2010).

W. Song et al., Interfacial electron transfer dynamics for [Ru(bpy)$_2$((4,4'-PO$_3$H$_2$)$_2$bpy)]$^{2+}$ sensitized TiO$_2$ in a dye-sensitized photoelectrosynthesis cell: factors influencing efficiency and dynamics *J. Phys. Chem. C* 115, 7081-7091 (2011).

A. Fujishima, K. Honda, Electrochemical photolysis of water at a semiconductor electrode. *Nature* 238, 37-38 (1972).

T. Nakagawa, N. S. Bjorge, R. W. Murray, Electrogenerated IrO$_x$ nanoparticles as dissolved redox catalysts for water oxidation. *J. Am. Chem. Soc.* 131, 15578-15579 (2009).

T. Nakagawa, C. A. Beasley, R. W. Murray, Efficient electrooxidation of water near its reversible potential by a mesoporous IrO$_x$ nanoparticle film. *J. Phys. Chem. C* 113, 12958-12961 (2009).

J. J. Concepcion, R. A. Binstead, L. Alibabaei, T. J. Meyer., Application of the rotating ring disc electrode technique to water oxidation by surface-bound molecular catalysts. *J. Am. Chem. Soc.*, (Submitted).

J. H. Alstrum-Acevedo, M. K. Brennaman, T. J. Meyer, Chemical approaches to artificial photosynthesis. 2. *Inorg. Chem.* 44, 6802-6827 (2005).

J. D. Blakemore et al., Half-sandwich iridium complexes for homogeneous water-oxidation catalysis. *J. Am. Chem. Soc.* 132, 16017-16029 (2010).

R. Brimblecombe, A. Koo, G. C. Dismukes, G. F. Swiegers, L. Spiccia, Solar driven water oxidation by a manganese molecular catalyst inspired by photosystem II. *J. Am. Chem. Soc.* 132, 2892-2894 (2010).

L. Duan et al., A molecular ruthenium catalyst with water-oxidation activity comparable to that of photosystem II. *Nat. Chem.* 4, 418-423 (2012).

L. Duan, A. Fischer, Y. H. Xu, L. Sun, Isolated seven-coordinate Ru(IV) dimer complex with [HOHOH](—) bridging ligand as an intermediate for catalytic water oxidation. *J. Am. Chem. Soc.* 131, 10397-10399 (2009).

L. Duan, Y. H. Xu, L. P. Tong, L. Sun, $Ce^{IV}$- and light-driven water oxidation by $[Ru(terpy)(pic)_3]^{2+}$ analogues: catalytic and mechanistic studies. *ChemSusChem* 4, 238-244 (2011).

J. F. Hull et al., Highly active and robust Cp* Iridium complexes for catalytic water oxidation. *J. Am. Chem. Soc.* 131, 8730-8731 (2009).

Y. Zhao et al., Improving the efficiency of water splitting in dye-sensitized solar cells by using a biomimetic electron transfer mediator. *Proc. Nat. Acad. Sci., U.S.A.* 109, 15612 (2012).

As previously stated, detailed embodiments of the present invention are disclosed herein; however, it is to be understood that the disclosed embodiments are merely exemplary of the invention that may be embodied in various forms. It will be appreciated that many modifications and other variations stand within the intended scope of this invention as claimed below. Furthermore, the foregoing description of various embodiments does not necessarily imply exclusion. For example, "some" embodiments may include all or part of "other" and "further" embodiments within the scope of this invention. In addition, "a" does not mean "one and only one;" "a" can mean "one and more than one."

We claim:

1. A photoharvesting complex comprising:
   a transparent conductive metal oxide core;
   a metal oxide shell having a thickness not greater than about 5 nm, wherein the metal oxide shell comprises $TiO_2$;
   a first molecule chromophore; and
   a second molecule catalyst.

2. The photoharvesting complex of claim 1, wherein the transparent conductive metal oxide core is chosen from tin-doped indium oxide (ITO), fluorine-doped tin oxide (FTO), antimony tin oxide (ATO), gallium zinc oxide (GZO), indium zinc oxide (IZO), copper aluminum oxide, fluorine-doped zinc oxide, and aluminum zinc oxide, and combinations thereof.

3. The photoharvesting complex of claim 1, wherein the first molecule chromophore is chosen from ruthenium coordination complexes, osmium coordination complexes, copper coordination complexes, porphyrins, phythalocyanines, and organic dyes, and combinations thereof.

4. The photoharvesting complex of claim 1, wherein the second molecule catalyst is chosen from transition metal catalysts.

5. The photoharvesting complex of claim 4, wherein the transition metal catalyst is chosen from iron catalysts, ruthenium catalysts, osmium catalysts, and combinations thereof.

6. The photoharvesting complex of claim 1, wherein the transparent conductive metal oxide core comprises nanoparticles of a transparent conductive metal oxide.

7. The photoharvesting complex of claim 6, wherein the nanoparticles have an average size of less than about 1 µm.

8. The photoharvesting complex of claim 6, wherein the nanoparticles have an average size of less than about 50 nm.

9. The photoharvesting complex of claim 6, wherein the nanoparticles have an average size of less than about 25 nm.

10. The photoharvesting complex of claim 6, wherein the nanoparticles have an average size of less than about 10 nm.

11. The photoharvesting complex of claim 1, wherein the transparent conductive metal oxide core comprises from tin-doped indium oxide (ITO), antimony tin oxide (ATO), or a combination thereof.

12. The photoharvesting complex of claim 11, wherein the transparent conductive metal oxide core comprises tin-doped indium oxide (ITO).

13. The photoharvesting complex of claim 11, wherein the transparent conductive metal oxide core comprises antimony tin oxide (ATO).

* * * * *